United States Patent [19]  
Zumbahlen et al.

[11] Patent Number: 4,582,023  
[45] Date of Patent: Apr. 15, 1986

[54] LIVESTOCK SELF-FEEDER

[75] Inventors: Dennis J. Zumbahlen; Vincent J. Zumbahlen, both of Newton; Cary L. Sizelove, Sr., Eureka; William J. Dietrich, Sr., Congervill, all of Ill.

[73] Assignee: Zumbahlen Equipment Company, Newton, Ill.

[21] Appl. No.: 671,288

[22] Filed: Nov. 14, 1984

[51] Int. Cl.[4] .............................................. A01K 5/00
[52] U.S. Cl. ...................................... 119/53.5; 119/54
[58] Field of Search .................................. 119/53.5, 54

[56] References Cited

U.S. PATENT DOCUMENTS

| | | | |
|---|---|---|---|
| 1,359,158 | 11/1920 | Dohm | 119/53.5 |
| 1,392,004 | 9/1921 | Fouts | 119/53.5 |
| 1,879,247 | 9/1932 | Holliday | 119/53.5 |
| 2,153,455 | 4/1939 | Casper et al. | 119/54 |
| 2,644,425 | 7/1953 | Hazen | 119/53.5 |
| 2,933,064 | 4/1960 | Geerlings | 119/53.5 X |
| 3,102,511 | 9/1963 | Atcheson | 119/53 |
| 4,353,329 | 10/1982 | Thibault | 119/52 A |
| 4,401,057 | 9/1983 | Van Gilst | 119/51 R |

OTHER PUBLICATIONS

"Rotary Hog Feeders" published by Delphi Products Co. (1 sheet).

Primary Examiner—Hugh R. Chamblee  
Attorney, Agent, or Firm—Emrich & Dithmar

[57] ABSTRACT

A livestock self-feeder includes a main feed storage hopper supplying feed to a retaining area in which the height of feed is constant and independent of the amount of feed in the main hopper. The feed is then dispensed from the retaining hopper through an adjustable feed gate.

12 Claims, 2 Drawing Figures

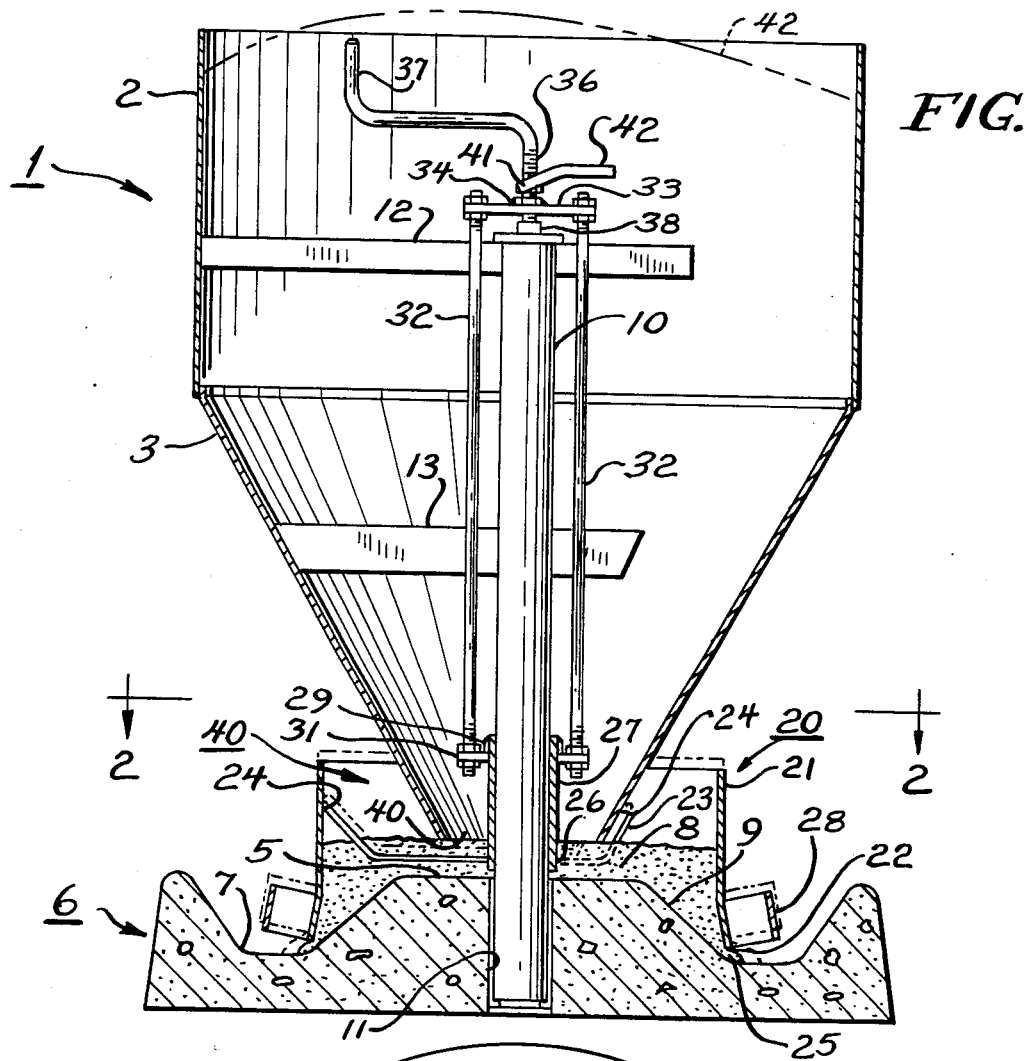

LIVESTOCK SELF-FEEDER

BACKGROUND OF THE INVENTION

This invention relates in general to a self-feeder for livestock and, in particular, to a feeder actuated by the animal for effecting the discharge of feed.

More specifically, but without restriction to the particular use which is shown and described for convenience of illustration, this invention relates to a feeder which provides controlled dispensing of the feed contained therein substantially dispensing of the quantity of feed contained in a main feed hopper.

In raising some livestock, for example hogs, a common practice is to utilize self-feeders wherein a large hopper is used to contain a substantial quantity of feed material which is then dispensed by the feeding hogs using their snouts to cause the feed in the container to be delivered into a feeding trough. One such self-feeder is disclosed in U.S. Pat. No. 1,392,004 which utilizes a container for retaining a quantity of feed which is dispensed between the open container bottom and a feed trough. Feed is dispensed by the action of the hog's snout pushing against an agitating rod which functions to agitate the feed causing it to move downwardly in the container, and against which continued pushing will cause the container to rotate upon its base for additional dispensing. Other self-feeders are disclosed in U.S. Pat. Nos. 1,879,247 and 2,153,455 both of which utilize an animal actuated adjustable agitator positioned at the bottom of the feed container which functions in cooperation with the bottom of the feed container to dispense feed into the feed trough.

While each of these prior art patents disclose a self-feeder apparatus, the discharge opening between the feed container and the feeding trough in each is fixed. Therefore, the quantity of feed dispensed by the animal is dependent upon the amount of feed contained in the container. Since the feed metering throat or gate is fixed and cannot be varied in accordance with the quantity of feed consumed from the container, changes in the amount of feed material contained within the feed storage hopper causes the quantity of feed dispensed to the animal to vary. Such apparatus will dispense the feed, but frequently the apparatus permits the animal to dispense too much feed resulting in spoilage and waste.

In order to provide an animal feeder wherein the quantity of feed dispensed may be varied in response to variation in the quantity of feed material contained in the feed storage hopper, feeders such as that disclosed in U.S. Pat. No. 2,644,425 have been developed. The feeder disclosed therein permits the space between the open discharge end of the feed storage hopper and the bottom of the feed trough to be adjusted by raising or lowering the feed hopper in response to variations in the quantity of feed material contained therein. In order to reduce the bulk and consequent weight which must be raised and lowered in adjusting the feed metering discharge opening of the apparatus of the '425 patent, the feeder disclosed in U.S. Pat. No. 3,102,511 utilizes a ring member positioned coaxially about, and in contact with, the discharge end of the feed container. In this manner, only the ring need be raised and lowered relative to the feed trough, to provide an adjustable feed metering throat or gate between the adjacent edge of the ring and the fixed hopper bottom.

Another example of an adjustable self-feeder is disclosed in U.S. Pat. No. 4,353,329, wherein the feed containing hopper is positioned above a base member, and the feed is discharged from the container through a central aperture into the feeding trough. The feed is then dispensed outwardly from the central aperture by a feed wheel which is rotated by a feeding animal. In order to prevent feed spillage and waste, the effort required to rotate the feed wheel increases with the quantity of feed contained in the feeding trough. The flow of feed material to the feed wheel may be varied by fixing the feed hopper at different heights relative to the feed trough base.

While the feeders described in each of these prior art patents may have been somewhat satisfactory, none has overcome the problem caused by the variation in the quantity of feed material contained within the feed hopper. Even those feeders which provide for adjustment of the feed metering throat or gate, require that such a manual adjustment must be repeatedly made as the quantity of feed material contained within the feed storage container or hopper changes. Such an adjustment may provide a partial solution, and an improvement over non-adjustable feeders, but as the quantity of feed material contained within the container or hopper again changes, further manual adjustment becomes necessary to prevent feed waste. The dispensing rate still remains dependent upon the amount of feed material contained in the feed storage container or hopper.

One attempt to provide a self-feeder which eliminates this problem is disclosed in U.S. Pat. No. 4,401,057 wherein an adjustable feed throat is provided to vary the quantity of feed material dispensed so that changes in the rate of feed flow to consuming hogs may be varied throughout the entire growth cycle of the animals. While a variable gate mechanism is disclosed to attain this objective, the feed material itself is not contained in a feed storage hopper or container. The feed supply is delivered to the feed dispensing mechanism by a feed conveyor which includes an auger tube and auger for delivering the feed material to the dispensing mechanism in controlled quantities.

Frequently feeder units are used in a fence line application for feeding hogs in two adjacent pens separated by the fence line in which the feeder is positioned. In such applications, if the dispensing of feed is not responsive to the amount of feed consumed by the hogs, feed is wasted. For example, in a fence line application, wherein hogs are contained in only one pen, it is extremely important to minimize the effect that the weight of the feed retained in the storage hopper has on the feed metering discharge gate to prevent continuous over-fill and spillage in the empty pen due to the animal feeding in the adjacent pen.

In the present invention, a large quantity of feed material is retained in a main storage hopper which, in turn, supplies the feed to a dispensing hopper through a lateral discharge opening. The dispensing hopper then stores smaller quantity of feed and is provided with a feed metering gate through which the feed is dispensed substantially independent of the quantity of feed material contained within the main storage hopper.

Feed passing from the dispensing hopper through the metering gate is discharged into a feed trough and made available to the animals in response to the quantity consumed, and substantially independent of the quantity of material contained within the main storage hopper. Therefore, the amount of feed in the trough remains substantially constant for a given setting of the metering gate; and feed wastage is minimized or eliminated.

SUMMARY OF THE INVENTION

It is, therefore, an object of this invention to improve livestock self-feeders.

Another object of this invention is to minimize feed spoilage and wastage.

A further object of this invention is to reduce the effect variation in the quantity of feed material stored in a main storage hopper has on the amount of feed in the feed trough of a livestock self-feeder.

Still another object of this invention is to provide a readily adjustable dispensing feed gate which remains substantially constant and responsive to feed consumption regardless of the quantity of feed material contained within the main storage hopper.

These and other objects are attained in accordance with the present invention wherein there is provided a livestock self-feeder wherein a large quantity of feed material is retained in a main storage hopper and discharged under gravity through a lateral discharge opening to a feed dispensing hopper. The height of feed material contained within the dispensing hopper is maintained generally constant and independent of the amount of feed in the main hopper. The feed material is then dispensed from the dispensing hopper through an adjustable feed gate which may be readily adjusted to maintain a desired quantity of feed material in a feeding trough substantially independent of the quantity of feed material contained within the main storage hopper.

DESCRIPTION OF THE DRAWINGS

Further objects of the invention together with additional features contributing thereto and advantages accruing therefrom will be apparent from the following description of a preferred embodiment of the invention which is shown in the accompanying drawings with like reference numerals indicating corresponding parts throughout, wherein:

FIG. 1 is a vertical profile view of a livestock self-feeder embodying the invention, with portions cut away to better illustrate the component parts thereof; and FIG. 2 is a cross-sectional view taken along lines 2—2 of FIG. 1, without the portions cut away in FIG. 1 being removed.

DESCRIPTION OF A PREFERRED EMBODIMENT

Referring now to the drawings, there is illustrated a livestock self-feeder which includes a main feed storage hopper 1 comprising a cylindrical upper wall 2 and a downwardly-converging funnel portion 3 having a bottom discharge opening 4 which is mounted above a flat central portion 5 of a concrete feeder base 6. The feeder base 6 provides a support for the feed storage hopper 1 and forms an inclined or sloped portion 9 leading from the central portion 5 to partially define an annular feed trough 7 from which animals feed.

The storage hopper 1 is carried upon a central upright support member 10, which may be formed as a round tube or post carried coaxially within the feeder base 6 in a suitable recess or sleeve 11 formed therein, or cast thereinto, to support the tube 10 in an upright manner.

The main storage hopper 1 is supported concentrically about the upright tube 10 by means of upper and lower bracket members 12 and 13, respectively, which are suitably secured to the feed hopper 1 and the support tube 10 as by welding. In this manner, the storage hopper 1 is positioned concentrically about the upright support tube 10 with the bottom discharge opening 4 being spaced a fixed distance above the central portion 5 of the feeder base 6 to form a lateral discharge gate 8 of constant height.

Positioned coaxially with and concentrically about a lower portion of the feed storage hopper 1 is a cylindrical retainer wall 20 which is located outwardly of the lateral discharge opening 8 to form a dispensing hopper 40 for retaining feed from the main hopper until it is metered into the trough as the livestock consumes the feed.

Retainer wall 20 includes a rotary feed wheel or ring 21 rotatable about the central support tube 10 and vertically adjustable along the central axis thereof. Vertical adjustment of the feed wheel 21 relative to the support tube 10, in a manner hereinafter described in detail, will vary the distance between the lowermost edge 22 of the wall and inclined portion 9 of the feeder base 6 for forming an adjustable feed metering gate 25 for metering feed from the dispensing hopper to the feed trough. Vertical positioning of the retainer wall 20 will provide a desired amount of feed in the trough (e.g. as the hogs grow, they will consume more feed) which is dependent upon the distance between the edge 22 of the feed wheel or ring 21 and the sloping portion 9 of the base 6.

The ring member 21 is positioned concentrically about and laterally of the discharge opening 4 of the main storage hopper 1, and extends above and below the discharge gate 8 formed in association therewith. Three spoke members 23 are secured at their outer end 24 to the inner wall of the ring member 21, as by welding, and at their inner end 26 secured in the same manner to a sleeve member 27 positioned concentrically about the upright support tube 10 and rotatable thereabout. Positioned circumferentially about the outer surface of the ring 21 are a series of equidistantly spaced U-shaped paddles 28 which, when engaged by the snout of the livestock, cause the dispensing hopper 20 to rotate about the upright support tube 10.

As can best be seen in FIG. 1, an important feature of this invention is that the pressure or weight of the stored feed material in the main storage hopper 1 rests on the central portion 5 of the base 6 so that that pressure is removed from the feed in the dispensing or retaining hopper and the height of feed in the dispensing hopper 40 is substantially independent of the amount of feed in the main hopper.

When a hog roots against a U-shaped paddle 28, the spokes 23 move the feed through the lateral discharge gate 8 into dispensing hopper 40 where it is partially defined by the feed wheel or ring 21. The slope of inclined portion 9 of base 8 feeds grain in the dispensing hopper 40 under gravity toward dispensing gate 25. Therefore, the pressure or weight of the feed in the temporary retaining hopper 40, which is applied to the dispensing gate 25, remains generally constant and is substantially independent of the amount of feed material contained in the main storage hopper 1. Since only a small portion of the spokes 23 are positioned under the discharge opening 4, the leverage advantage of a hog rooting against the U-shaped paddles 16 permits the feed wheel or ring 21 to be readily rotated against the pressure of the grain held in the feed storage hopper 1. In this manner, the dispensing gate 25 can be closely adjusted to meter small amounts of feed to the trough 7, thereby preventing the accumulation of large amounts of feed which could be rooted from the trough 7 and wasted.

In order to adjust the opening of dispensing gate 25, the retainer wall 20 is connected to a vertical positioning system. To this end, an upper end of a ring member 29 is appropriately secured, as by welding, to the upper end of the sleeve member 27 to form a bearing surface on the lowermost face of the ring 29 which is engaged by the upper surface of a lower support plate 31. In this manner, the lower face of the ring member 29 will rotate upon the upper face of the lower support plate 31. The lower support plate 31 is secured to a pair of support rods 32 which are fastened with one on either side of the central upright support tube 10, and positioned parallel therewith. The upper ends of the support rods 32 are secured to an upper support plate 33 which is formed with a central aperture therein to which a nut 34 is appropriately secured to the upper face thereof for engagement by a threaded portion 36 of a crank member 37.

The threaded portion 36 of the crank member 37 extends through the nut 34 secured to the upper support plate 33 into the central upright support tube 10 through an end cap or sleeve 38 secured to the uppermost portion of the central upright support tube 10 and the upper support brace 12. In this manner, rotation of the arm of crank 37 will cause the support rods 32 to move along the threaded portion 36 raising or lowering the retainer wall 20 relative to the inclined portion 9 of feed hopper base 6. When a desired opening for the dispensing gate 25 has been set, the crank 37 may be locked in position by means of a lock nut 41, which is threadingly engaged about the threaded portion 36 of the crank 37, and has an arm portion 42 attached thereto for ease of movement.

In operation, a quantity of feed material is placed in the main storage hopper 1, and is passed to the dispensing hopper 40 through the lateral discharge opening 8 formed between the lower edge of the wall 3 and the center portion 5 of the base 6. This fixed or passive discharge opening or gate 8 so formed remains constant at all times. The action of feeding livestock causing the retainer wall 20 to rotate about the feed storage hopper 1 will cause a quantity of feed material to flow under gravity from the main storage hopper and through the lateral discharge opening and spread throughout the dispensing hopper 40 promoted by action of the spoke members 26. To this end, the spoke members 23 are formed with an upright bent portion to enhance spreading the feed material within the dispensing hopper 40 without piling feed higher against retainer wall 20. The quantity of feed material contained within the dispensing hopper 40 will remain substantially constant regardless of the quantity of feed material contained in the main storage hopper 1. For example, the mechanism for adjusting the discharge gate is not used on a daily basis, but only as the hogs grow and require more feed. Hence, feed may be loaded into the main hopper even to the level illustrated by the dashed profile 42.

The amount of feed material dispensed from the dispensing hopper 40 through the adjustable feed metering dispensing throat or gate 25 will depend on usage, but the amount in the feed trough will remain substantially constant because the quantity of feed material in the dispensing hopper is always maintained at a substantially uniform level as determined by the setting of the dispensing gate. The effect of the weight of the feed material contained within the main storage hopper is thereby minimized, or eliminated, because the pressure exerted by the retained quantity of feed material is born by the central portion 5 of the base 6 and is not exerted against the dispensing gate 25.

While the invention has been described in the specification and illustrated in the drawings with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment illustrated by the drawings and described in the specification as the best mode presently contemplated for carrying out this invention, but that the invention will include any embodiment falling within the scope of the appended claims.

What is claimed is:

1. A livestock self-feeder actuable by feeding livestock for dispensing a controlled quantity of feed from a storage hopper substantially independent from the quantity of feed retained within the storage hopper comprising main hopper means for storing feed material and including a hopper discharge opening through which the feed material contained therein may pass under gravity, a feeder base for supporting said main hopper means and including a feeding trough, said feeder base further including a generally horizontal central supporting portion defining an area at least as great as the area of said discharge opening and positioned beneath said hopper discharge opening for receiving and supporting feed material in said main hopper means; said hopper discharge opening and said central supporting portion of said feeder base cooperating to define a lateral discharge opening through which feed material may pass, means forming a dispensing hopper positioned in communication with said lateral discharge opening for receiving feed material passed laterally therethrough, livestock actuable dispensing means for removing feed material retained in said main hopper means and passing said feed material through said lateral discharge opening into said dispensing hopper, and said feeder base including means cooperating with said dispensing hopper defining a dispensing gate for controlled dispensing of feed material from said dispensing hopper into said feed trough in response to actuation of said livestock actuable dispensing means.

2. The apparatus of claim 1, wherein said main hopper means includes a funnel-shaped wall having a lower circular discharge opening and said central portion of said feeder base surface extends beneath said circular discharge opening.

3. The apparatus of claim 1, wherein said dispensing hopper includes a vertically adjustable retaining wall adjustable relative to said feeder base for varying the opening of said dispensing gate formed therebetween.

4. The apparatus of claim 3, wherein said retaining wall includes a cylindrically-shaped rotatable feed wheel positioned concentrically about said lateral discharge opening.

5. The apparatus of claim 4, wherein said feed wheel includes a plurality of paddle members extending outwardly from an outer peripheral surface of said feed wheel for engagement by livestock to effect the rotation thereof.

6. The apparatus of claim 4, further including a vertically extending support tube carried by said feeder base and supporting said main hopper means, and a sleeve member carried concentrically about a lower portion of said support tube for vertical movement along the vertical axis thereof and rotational movement thereabout, said sleeve member being operatively connected to said rotatable feed wheel for rotation therewith, and to effect the vertical movement thereof in response to vertical movement of said sleeve member.

7. The apparatus of claim 6, further including a threaded crank member carried within said support tube for rotational movement therewithin and operatively connected with a pair of guide rods extending parallel to said support tube on opposed sides of the exterior thereof, said guide rods each being joined at a lower end thereof to a support plate positioned concentrically about a lower portion of said support tube, and a ring member secured at an upper portion of said sleeve member for vertical and rotational movement therewith, said ring being carried upon said support plate for vertical movement therewith and rotational movement relative thereto.

8. The apparatus of claim 7, wherein said support tube, said sleeve and said support plate are concentrically positioned relative to each other.

9. The apparatus of claim 8, further including lock nut means carried on said threaded crank for fixedly securing said rotatable feed wheel in a vertical position.

10. In a livestock self-feeder wherein a quantity of feed material is retained in a feed storage hopper carried by a feeder base, and having a discharge opening through which the feed material passes from the feed storage hopper through a feed metering discharge gate to a feeding trough, the improvement comprising a first discharge gate formed between the discharge opening of the feed storage hopper and a generally horizontal retained feed supporting portion of the feeder base, said retained feed supporting portion of the feeder base defining an area at least as great as the area of the discharge opening of the feed storage hopper and being positioned adjacent to the discharge opening of the feed storage hopper for receiving and supporting the contents of feed material retained in said feed storage hopper, a feed dispensing hopper positioned in communication with said dischage gate for receiving a quantity of feed material passed laterally therethrough, livestock actuable dispensing means for removing a portion of the feed material retained in the feed storage hopper and passing said portion of feed material so removed through said discharge gate into said feed dispensing hopper, and dispensing gate means formed between said dispensing hopper and the feeder base for dispensing feed material into the feed trough in response to actuation of said livestock actuable dispensing means.

11. Apparatus for metering feed to livestock comprising: a base having a generally horizontal central portion, an annular feed trough spaced outwardly of said central portion, and an inclined portion extending downwardly from said central portion of said trough; a main storage hopper mounted above said base and defining a lower discharge opening spaced above said central portion of said base and cooperating with said central portion of said base to define a first lateral discharge opening; a generally cylindrical retainer wall mounted for rotation and adapted to be engaged and rotated by livestock feeding at said trough, said retaining wall spaced laterally from said first lateral discharge opening for at least partially defining a dispensing hopper to receive feed flowing from said main hopper through said first lateral discharge opening, said retainer wall spaced above and cooperating with said inclined portion of said base to define a second lateral discharge opening for metering feed from said dispensing hopper under gravity into said trough for said livestock, whereby feed flowing from said dispensing hopper into said trough is replenished with feed from said main hopper and the height of feed in said dispensing hopper is generally constant and substantially independent of the amount of feed in said main hopper.

12. The apparatus of claim 11, wherein said retainer wall is generally cylindrical, and further comprising an upright post carried by said base and supporting said main hopper; and means for mounting said retaining wall to said post for rotation about said post and for vertically adjusting said retainer wall relative to said base.

* * * * *